United States Patent [19]

Stover et al.

[11] Patent Number: 4,676,150
[45] Date of Patent: Jun. 30, 1987

[54] HINGED COVER FOR BEVERAGE RESERVOIR

[75] Inventors: Kenneth W. Stover; Raymond Bledsoe, both of Springfield; Henry L. Foley, Chatham, all of Ill.

[73] Assignee: Bunn-O-Matic Corporation, Springfield, Ill.

[21] Appl. No.: 841,574

[22] Filed: Mar. 20, 1986

[51] Int. Cl.⁴ ............................................. A47J 31/00
[52] U.S. Cl. .................................................... 99/295
[58] Field of Search ............... 99/279, 285, 300, 304, 99/295, 302 R, 307; 285/231, 345; 403/191, 197, 220; 220/335

[56] References Cited

U.S. PATENT DOCUMENTS

| | | | |
|---|---|---|---|
| 4,207,809 | 6/1980 | Brill | 99/295 |
| 4,309,939 | 1/1982 | Stover | 99/295 |
| 4,464,981 | 8/1984 | Stover | 99/280 |
| 4,478,139 | 10/1984 | Zimmerman | 99/280 |
| 4,579,048 | 4/1986 | Stover | 99/295 |
| 4,621,571 | 11/1986 | Roberts | 99/295 |

*Primary Examiner*—Robert W. Jenkins
*Attorney, Agent, or Firm*—Lockwood, Alex, FitzGibbon & Cummings

[57] ABSTRACT

A combination coffee-making and dispensing machine which has a beverage reservoir which is retained in a cabinet. The reservoir is provided with a cover to reduce evaporation. The cover is hinged to the cabinet in a way that permits it to be tilted and lifted off the reservoir and remain in the cabinet when the reservoir is removed. The cover can be readily lowered in place on the reservoir when the latter is re-positioned in the cabinet.

7 Claims, 9 Drawing Figures

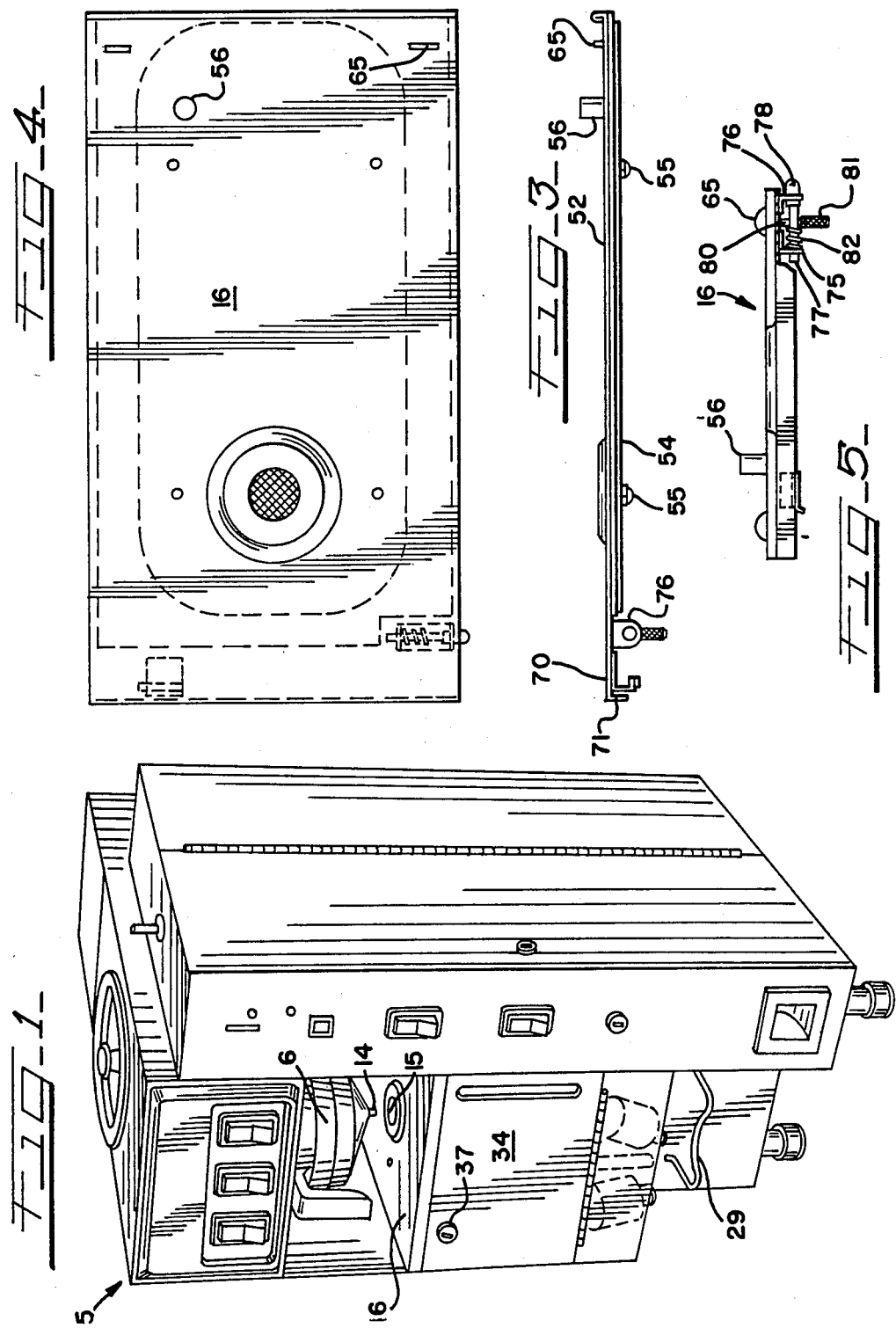

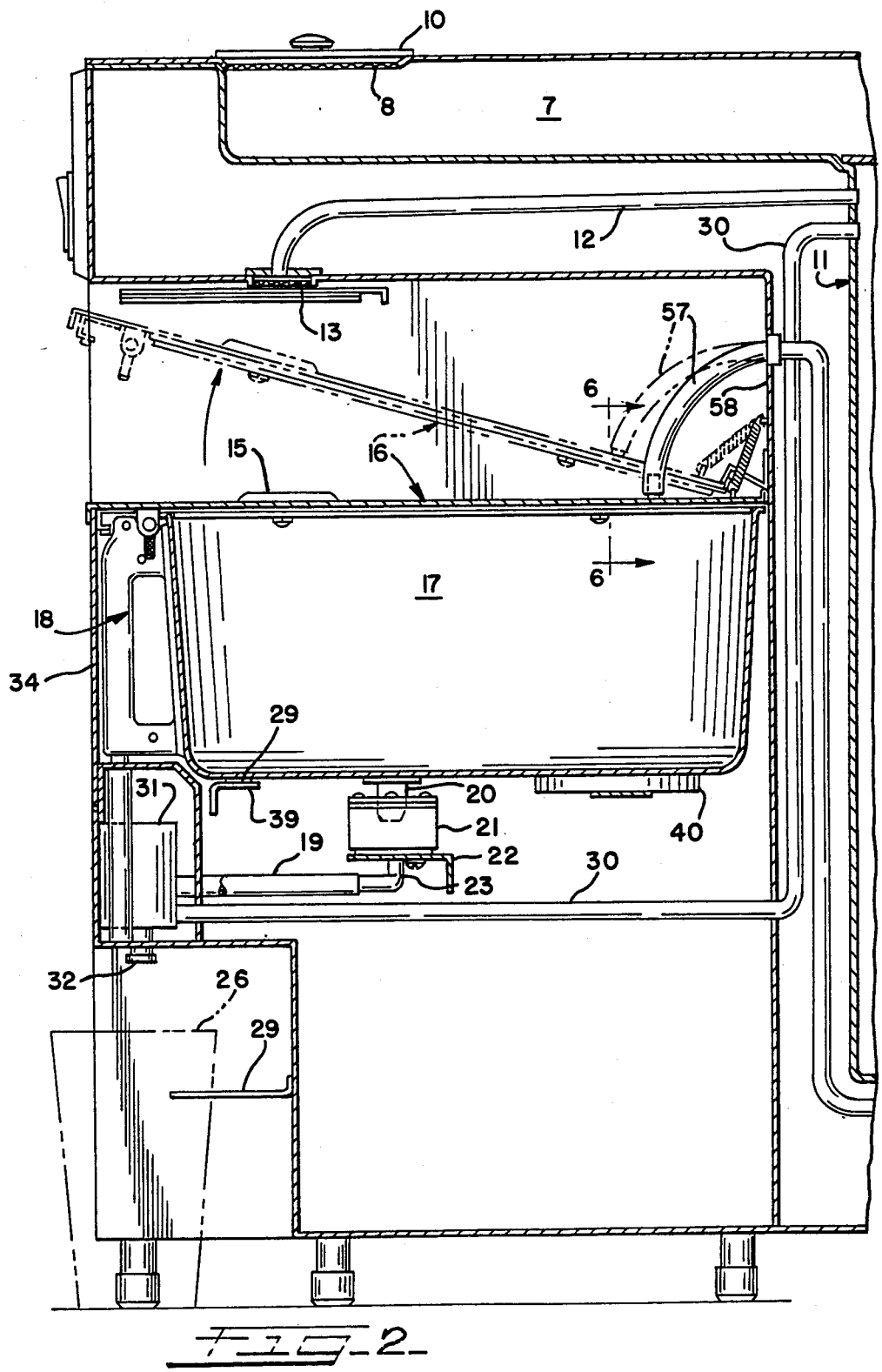
FIG_2

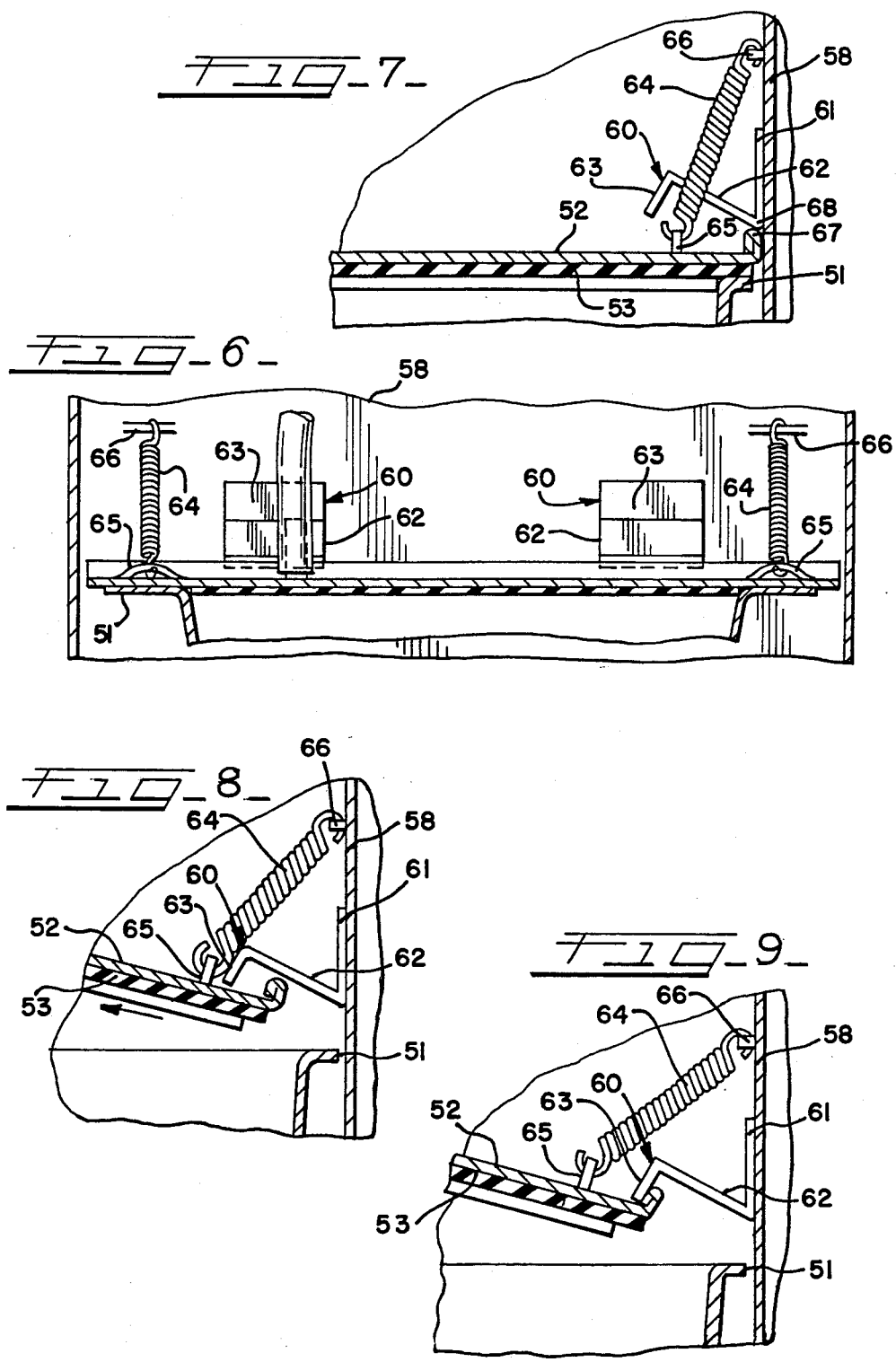

HINGED COVER FOR BEVERAGE RESERVOIR

SPECIFICATION

This invention relates, generally, to coffee making and dispensing machines which include a reservoir in which coffee is accumulated and from which it is withdrawn in cup-sized increments. More particularly, the invention relates to an improved hinged cover for the reservoir of such a machine which facilitates the insertion and removal of the reservoirs into the machines while providing a satisfactory seal therefore when the reservoirs are in their fully inserted position and the covers are fully lowered thereon.

The invention is particularly useful in connection with coffee making and brewing machines which incorporate a coffee brewing apparatus, a reservoir for accumulating a supply of coffee (e.g. one gallon) and mechanism for dispensing the coffee in cup-size increments. Generally, such machines will be coin operated and the reservoirs will be locked in compartments so as not to be accessible to consumers. However, the reservoirs need to be removable for cleaning purposes. Further, when the reservoirs are in place in their compartments they will normally be heated and should be provided with reasonably tight-fitting covers so as to minimize evaporation of the contents.

The present inventions relates particularly to the hinge mechanism for the reservoir covers which permit the reservoirs to be readily inserted and removed with a tilting movement in the relatively restricted compartments available for the reservoirs.

The object of the invention generally stated, is the provision of an improved hinge mechanism for covers for the reservoirs of coffee making and dispensing machines which covers remain in the machines in the compartments provided for the reservoirs while the reservoirs themselves are removed from the machines.

An important object of the invention is a hinge mechanism of the foregoing type which allows the covers to be tilted upwardly from their outer or front ends while being simultaneously moved laterally and upwardly off the rims of the reservoirs with which they are associated.

A further object of the invention is the provision of reservoir covers of the foregoing type which are provided at their front or outer ends with a formation which cooperates with outwardly turning compartment doors so that the doors and the covers can be interlocked and secured together.

Certain other objects of the invention will become apparent from the following detailed description of an embodiment of the invention which is shown in the accompanying drawings wherein:

FIG. 1 is a front, top and left side perspective view of a coffee making and dispensing machine embodying the invention;

FIG. 2 is a vertical section taken on line 2—2 of FIG. 1;

FIG. 3 is a side elevational view on line 3—3 of FIG. 4 of a hinged cover for a reservoir enclosed in the machine of FIG. 1;

FIG. 4 is a top plan view of the reservoir cover shown in FIG. 3;

FIG. 5 is an end elevational view of the cover taken on line 5—5 of FIG. 3;

FIG. 6 is a fragmentary elevational view taken on line 6—6 of FIG. 2;

FIG. 7 is a fragmentary detail sectional view taken on line 7—7 of FIG. 6;

FIG. 8 is a view similar to FIG. 7 showing the hinge mechanism for the cover with the cover in a partially raised condition; and, FIG. 9 is a view similar to FIG. 7 showing the condition of the hinge mechanism when the cover is in its fully lifted position.

Referring to FIG. 1 of the drawings, a coin-operated coffee-making and dispensing machine is indicated generally at 5 which incorporates a combination automatic/pour-in coffee brewing machine of known type such as the ones disclosed in U.S. Pat. Nos. 4,464,981 granted Aug. 14, 1984 to Kenneth W. Stover and 4,478,139 granted Oct. 23, 1984 to John D. Zimmerman, the disclosures of which are incorporated by reference herein. As is known and as described in these patents, a brewing funnel 6 is provided into which a disposable paper filter is inserted and on top of which a charge of coffee is placed. A batch of cold water is then introduced into a cold water basin 7 (FIG. 2) either automatically from a pressurized source (e.g. the water distribution system of a building) or manually through a screened opening 8 provided with a removable cover 10.

The cold or cool water drains from the basin 7 through a fill tube (not shown) into the bottom of a hot water tank 11 from which it upwardly displaces an equal amount of hot water through the hot water tube 12 from which it discharges through a spray nozzle 13 and sprays onto the coffee within the funnel 6. The resulting fresh-brewed coffee discharges from the funnel 6 through the bottom outlet 14 (FIG. 1) which is centered over an opening 15 in the hinged cover 16 of a reservoir or container 17.

The front sidewall of the reservoir 17 is equipped with a handle indicated generally at 18 which is used to manually insert and remove the reservoir 17 into and from the space or compartment it occupies within the machine 5. The bottom of the reservoir 17 is provided with a discharge nipple 20 which is insertable and removable with a liquid-tight fit, into and from the top of a sump 21 mounted on a support bracket 22.

The sump 21 has a bottom opening and the bottom is equipped with an outlet fitting 23 from which a connection 19 can be made to a beverage dispensing valve 24 (FIG. 1) which is solenoid-controlled and which has a bottom discharge spout 25. It will be apparent that when the valve 24 is actuated to its open position, beverage from the interior of the reservoir 17 will flow by gravity from the sump 21 through right-angle fitting 23 and connection 19 to valve 24 and discharge from the spout 25 (FIG. 1) into a cup or other container such as indicated in broken line at 26 (FIG. 4). Preferably, a wire cup locator 29 is provided to facilitate proper placement of cups under the spout 25.

In order for the machine 5 to have the ability to provide hot water for customers desiring to make tea, hot chocolate, soup or some other beverage, a hot water discharge line 30 (FIG. 2) is provided which leads from a discharge opening in the upper portion of the hot water reservoir 11 downwardly and thence to the front of the machine 5 where it connects with a second solenoid-operated valve 31 having a discharge spout 32.

The machine 5 is provided on one side with a coin-operated mechanism of known commercial type indicated generally at 33 in FIG. 1. The details of this type of mechanism and the manner in which it functions to control the solenoid valves 24 and 31 are known and do not form a feature of the present invention. Briefly, it permits a consumer upon depositing the required coin or coins, to selectively obtain a cup of coffee or hot water.

Normally, the door for the opening to the interior of the coin-operated mechanism 33 is locked as is also a downwardly opening door 34 which leads to the compartment in which the reservoir 17 is confined. The door 34 is hinged at the bottom as indicated at 35 (FIG. 1) and is provided with a vertical slot-like opening 36 through which a sight glass or tube may be viewed which measures the height of liquid within the reservoir 17. The lock mechanism for the door 34 is such that it also locks the hinged cover 16 in its downward position. By interlocking the top edge of the door 34 and the front edge of the cover 16 together in the interfitting relationship shown in FIG. 2, neither of these can be moved until the lock 37 is manipulated.

The support for the inner or back end of the reservoir 17 within the housing of the machine 5 is an electric heater 40 at the back of the reservoir compartment. The front or handle-end of the reservoir 17 is supported by a bracket 39 provided with resilient pads 29 at the front. On opening the lock 37 and raising the cover 16 and lowering the door 34, the handle 18 may be grasped and used to tilt the reservoir 17 upwardly thereby lifting it off the pads 29 and bracket 39 at the front while at the back it continues to rest on the heater 40. When the reservoir 17 has been tilted sufficiently to fully withdraw the nipple 20 from the sump 21 it can be removed from its compartment through the front access side of the machine 5.

The present invention is particularly concerned with the hinge mechanism by means of which the reservoir cover 16 is supported so as to be simultaneously tiltable and shiftable to a raised position off the reservoir 17 as shown in FIG. 2 and to be lowered into sealing relationship with the outwardly extending lip or flange 51 (FIGS. 6 and 7) at the upper rim of the reservoir. As mentioned above, the cover 16 should have a good sealing relationship with the reservoir 17 in order to prevent excess evaporation of the reservoir contents.

Referring to FIGS. 3–5, the cover 16 comprises a rectangular rigid member 52 which may be formed of sheet metal or other suitable material and has dimensions so as to fit over the peripheral flange 51 of the reservoir 17 with an extension on the outer or front end for cooperation with the door 34 to the reservoir compartment.

On the underside, the member 52 carries a rectangular gasket 53 formed of resilient rubber-like material and having dimensions which correspond to those of the lip or flange 51. The gasket 53 is supported in place from the underside by a plate 54 secured to the cover member 52 by four fasteners 55—55.

In addition to the screened opening 15 in the cover 50 which extends through the member 52, gasket 53 and support plate 54, the cover 16 is provided with an upstanding nipple 56 on the member 52 over which is telescoped the discharge end of a cold rinse water inlet tube 57 (FIG. 2).

The hinge mechanism for connecting the cover 16 adjacent its rear to the inner vertical wall 58 of the reservoir compartment is shown best in FIGS. 6–9. A pair of cover guide and stop members 60 are secured to the wall 58. Each of the members 60 has a vertical section 61 which may be spot welded to the wall 58 or otherwise secured depending upon the materials from which the member 60 and wall 58 are formed. Each member 60 also has an upwardly inclined cantilever section 62 from the distal end of which a downwardly projecting lip or flange 63 extends.

Outwardly of the members 60 a pair of tension springs 64—64 are provided, the opposite ends of which are hooked over hook formations 65 and 66 struck outwardly from the materials of cover member 52 and the wall 58, respectively.

When the cover 50 is in its lowered and sealed position on the lip 51 of the container 17 as shown in FIGS. 2 and 7, the top of a integrally formed rib 67 extending along the back edge of the member 52 engages the underside of the corner 68 formed between the section 61–62 of the members 60. The positioning of the corners 68 and engagement therewith by the upper edge of the ledge or rib 67 are such that the gasket 53 is pressed down against the lip 51.

When the front or outer end of the cover 16 is tilted upwardly, the upper edge on the rib or ledge 67 is freed from the corners 68 allowing the rib to travel upwardly and outwardly along the undersides of the cantilever sections 62 of the members 60 as illustrated in FIG. 8. The tension provided by the springs 64 is adequate to cause the top surface of the cover member 52 to engage and follow or ride the underside of the bottom edge of the flange or lip 63 until the rib 67 engages against the inner or back side of the lip as shown in FIG. 9. This corresponds to the fully raised or tilted condition of the cover 16 as shown in FIG. 2. In this position of the cover 16, the reservoir 17 may be removed from its compartment by lifting its outer or front end using the handle 18 so as to free the nipple 20 from the sump 21.

It will be seen that when the reservoir is to be replaced into its compartment, it will also be initially tilted and when the nipple 20 is over the sump 21 the reservoir is lowered to its horizontal and fully inserted position. The cover 16 can then be lowered and replaced onto the reservoir 17 by simultaneous lowering and inwardly shifting of the cover. This movement terminates when the top edge of the rib 67 is pushed underneath the corners 68 with the cover 16 in its horizontal position.

The plate 52 of the cover 16 has an integral extension or margin 70 at its front or outer end from which depends a flange 71 which fits over and engages the outside of the upper edge of the front door 34 when the latter is closed and the cover 16 is closed as shown in FIG. 2. On the underside of the margin 70 a hook or catch 72 is secured which is engageable by a latch 73 of the lock 37 which is mounted on the door 34. It will be seen that when the latch 73 is in position over the hook or catch 72, the cover 16 cannot be raised and the door 34 cannot be opened.

Preferably, the cover 16 is provided with a releasable catch mechanism for retaining the cover 16 in its raised or lifted position. This mechanism comprises a pair of L-brackets 75 and 76 (FIG. 5) secured in opposing relationship on the underside of the cover 16. A pin 77 having a head 78 with a rounded end is slidably and rotatably mounted in openings in the depending legs of the brackets 75 and 76. A pin 80 with a knurled end 81 projects through the pin 77. A spring 82 fits over the pin 77 between the bracket 75 and pin 80 so as to normally bias the head 78 outwardly. When the cover 16 is fully raised, the rounded head 78 will fit into an opening or dimple (not shown) in the sidewall of the machine thereby retaining the cover in its raised position. The cover 16 can be released from its raised position by pushing the handle 81 to the left as viewed in FIG. 5.

What is claimed is:

1. In a coffee-making and dispensing machine having a front side providing access to a brewing funnel, reservoir and dispensing spout and wherein coffee discharges by gravity from said brewing funnel into said reservoir from which increments of coffee are discharged by gravity to said dispensing spout located toward the bottom of said front access side, said reservoir being in a generally level position when said machine is in service and being insertable into and removable from the machine through said front side when the front end of said reservoir is tilted up;

a cover for said reservoir having an opening through which coffee discharges into said reservoir from said brewing funnel and a hinge mechanism for said cover which allows said cover to be simultaneously tilted upwardly in said front side and lifted off said reservoir while said reservoir remains in its said generally horizontal position;

said hinge mechanism being mounted on a rigid structural part of said machine extending upwardly along the rear end of said reservoir and said hinge mechanism comprising, at least one rigid cantilever member secured at its proximal cantilever end to said structural part at a level above a rear lip of said reservoir and said cantilever member having on its distal end a downwardly projecting flange portion having a lower edge, at least one tension spring having one end secured to said structural part at a level above the bottom of said proximal cantilever end of said cantilever member and having its other end secured to the top of said cover adjacent the back edge thereof, said spring providing sufficient tension to cause the top side of the rear margin of said cover to engage said lower edge of said flange portion when the front end of said cover is lifted off said reservoir and said cover is pulled toward said front side so as to permit insertion and removal of said reservoir.

2. In the coffee making machine of claim 1, a plurality of said rigid cantilever members and a plurality of said tension springs.

3. In the coffee making machine of claim 1, an upstanding rib extending along the back edge of said cover, each said rigid cantilever member having a downwardly facing edge at the base of its said proximal end juxtaposed to said structural part, and wherein the top of said rib engages said downwardly facing edge when said cover is in its horizontal closed position on said reservoir.

4. In the coffee making machine of claim 3, a gasket comprised between said cover and the lip of said reservoir when said cover is in its closed position, the compression being provided at least in part by said engagement between the top of said rib and said downwardly facing edge.

5. In the coffee making machine of claim 1, said structural part being a vertical wall, and each said rigid cantilever member being integrally formed of sheet material and comprising a vertical attaching section attached to said wall, an upwardly inclined cantilever section connected to the bottom of said vertical attaching section, and a downwardly projecting flange section at the distal end of said cantilever section.

6. In the coffee making machine of claim 1, a compartment for said reservoir, and an outwardly opening door in said front side for opening and closing said compartment, interengaging means interconnecting said door and said reservoir cover when said door is closed and said cover is closed on said reservoir, and locking means for said interengaging means for preventing said door from being opened and said cover from being raised.

7. In the coffee making machine called for in claim 6, said interengaging means comprising a downwardly extending flange on the outer front edge of said cover which fits over the top edge of said door, and said locking means is carried by one of said cover and said door and has a latch which has locking engagement with the other of said cover and door.

* * * * *